Figure 1:
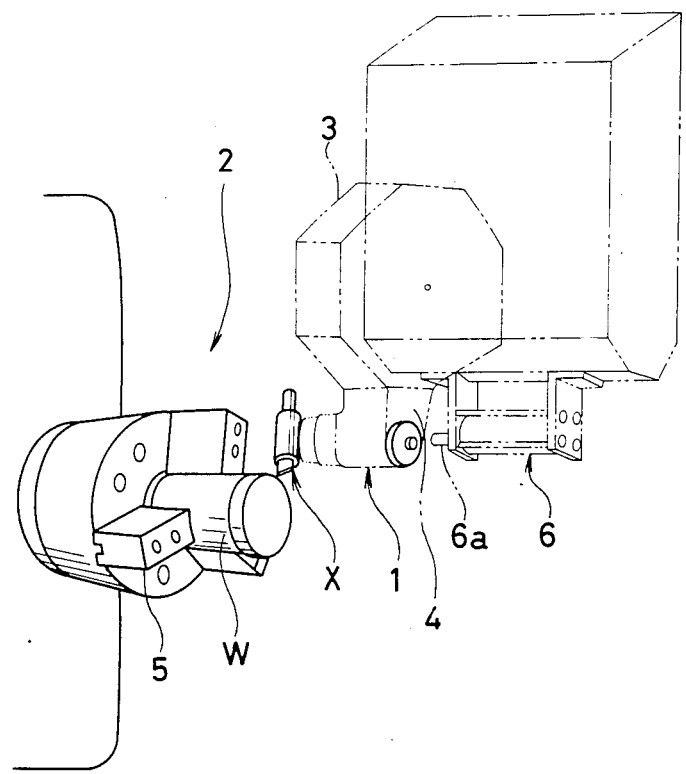

United States Patent [19]

Kojima et al.

[11] Patent Number: 4,680,999
[45] Date of Patent: Jul. 21, 1987

[54] REPLACEABLE TOOL

[75] Inventors: Sadao Kojima; Hitoshi Abe; Fumio Ishizaki, all of Utsunomiya; Atusi Otani; Hidefumi Shirotori, both of Tokyo, all of Japan

[73] Assignees: Kyoritsu Seiki Corporation; Hitachi Seiki Co., Ltd., both of Tokyo, Japan

[21] Appl. No.: 751,829

[22] Filed: Jul. 5, 1985

[30] Foreign Application Priority Data

Jul. 11, 1984 [JP] Japan ............................ 59-142177
Jul. 11, 1984 [JP] Japan ............................ 59-142178
Mar. 19, 1985 [JP] Japan ............................ 60-53341

[51] Int. Cl.⁴ .................. B23B 29/00; B23B 31/10
[52] U.S. Cl. .............................. 82/36 B; 29/568; 82/36 A; 279/75; 409/233
[58] Field of Search ............... 82/36 B, 36 A, 36 R; 279/75; 409/233; 29/568

[56] References Cited

U.S. PATENT DOCUMENTS 3,551,974  1/1971  Fantoni .
3,851,562  12/1974 Tomita et al. .................. 409/233
4,135,418  1/1979  McCray et al. ................. 279/75
4,499,800  2/1985  Stahl .............................. 82/36 R

FOREIGN PATENT DOCUMENTS 58-101303  7/1983  Japan .
2053748    2/1981  United Kingdom ........... 82/36 A Primary Examiner—Nicholas P. Godici
Assistant Examiner—Jerry Kearns
Attorney, Agent, or Firm—Armstrong, Nikaido, Marmelstein & Kubovcik

[57] ABSTRACT

A replaceable tool is comprised of a tool holder forming a hole providing an engageable ditch on the insert end of the shank, a fitted hole for detachably fitting the shank of this tool holder therein and a sleeve providing a plurality of locking balls to be engaged and removed from the fitted ditch of the tool holder in the fitted hole. In the interior of the fitted hole of the sleeve, the locking balls are pressed on the engageable ditch and the draw collar for applying attraction in the axial direction of the sleeve is slidably provided. When the shank of the tool holder is fitted in the fitted hole of the sleeve, the head portion end of the tool holder is designed to be pressed on the end flange portion of the fitted hole of the sleeve, and when the draw collar is pulled in the axial direction of the sleeve, the shank portion is expanded through locking balls so as to be pressed on the inner wall surface of the fitted hole of the sleeve.

6 Claims, 7 Drawing Figures

REPLACEABLE TOOL

BACKGROUND

The present invention relates to a replaceable tool employed in, for example, a turret lathe or the like, and more particularly to a replaceable tool which can easily and securely attach a tool holder mounting various kinds of tools to a sleeve on a tool post.

In general, in the case of attaching a tool holder mounting various kinds of tools to a tool post and the like in various kinds of machine tools such as a turret lathe and the like, it is well-known that the simplicity of the attachment thereof and the attaching condition of the tool holder to a sleeve of the tool post seriously influence the working efficiency. By the way, as a conventional replaceable tool such as shown in Japanese Utility Model Application Kokai (=Laying-open) Publication No. 58-110303 (Applicant: Kenna Metal, Inc.) for example, proposed has been that the replaceable tool whose locking is accomplished by the method wherein a shank of the tool holder mounting various kinds of tools is inserted to a fitted hole of a sleeve attached to a machine base. An engageable ditch formed in the fitted hole of the sleeve is expanded to be engaged with a plurality of locking balls provided inside the shank and the balls are pressed in the sleeve-radial direction.

However, the above-stated conventional replaceable tool has a type of locking groove of the tool holder with the balls under the condition of pressing the balls in the sleeve-radial direction. Accordingly, it has a disadvantage that the attraction cannot be sufficiently brought about in the longitudinal direction of the sleeve, because in case the tool holder operates its attraction in the longitudinal direction of the sleeve, the force is made to be a vertical component of a force (in the radial direction of the sleeve). Further, in the case of the conventional replaceable tool, the flange portion at the rear face of the tool holder is not inevitably locked in the condition under which the balls are pressed on the fitted hole face of the sleeve. Thus, in the case of accomplishing a heavy cutting or the like, it has a disadvantage that the curving moment is operated to a tool holder so as to bring about the vibration with locking points of balls as fulcrums and thus the working efficiency is lowered.

Moreover, it has a disadvantage that, in case there exists errors in the fitted portion of the sleeve and the shank portion of the tool holder or the shank is getting smaller in a diameter on account of an abrasion or the like, it is impossible to accomplish the locking by uniformly pressing a plurality of balls on the fitted hole face of the sleeve because the rear face is made shaky by the curving moment or the like of the tool holder.

SUMMARY

The present invention is designed in consideration of the conventional disadvantages described above.

It is a first object of the present invention to provide a replaceable tool which can effectively prevent self-excited vibration of the tool holder when accomplishing the heavy cutting or the like by the construction wherein the face of the tool holder is pressed on the face of the fitted hole circumference so as to realize the secure locking.

It is a second object of the present invention to provide a replaceable tool which can effectively prevent the self-excited vibration of the tool holder and at once can ameliorate the cutting efficiency and the working accuracy by expanding a shank portion through a plurality of balls so as to press the shank portion on the inner surface of the fitted hole of the sleeve by means of pulling a draw collar in the axial direction of the sleeve.

It is a third object of the present invention to provide a replaceable tool which can hold a strong locking state by reducing a radially-pressing component of a force of a turret flange by means of pulling core parts of locking balls horizontally and enlarging the horizontal impellent force of locking balls.

Further, it is a fourth object of the present invention to provide a replaceable tool which can realize the secure locking state by effectively absorbing the gap by means of uniform pressure of locking balls, even if the gap is brought about by a working error, an abrasion and the like in the fitted portion between the tool holder and the sleeve.

It is a fifth object of the present invention to provide a replaceable tool which can realize respective locking states corresponding with kinds of tools by means of the construction wherein the pressure in the locking direction of a draw rod can be optionally arranged.

It is a sixth object of the present invention to provide a replaceable tool which can simply attach or remove a tool holder from a taper sleeve and can have compact construction by shortening the overall length.

THE DRAWINGS

Figure 2:
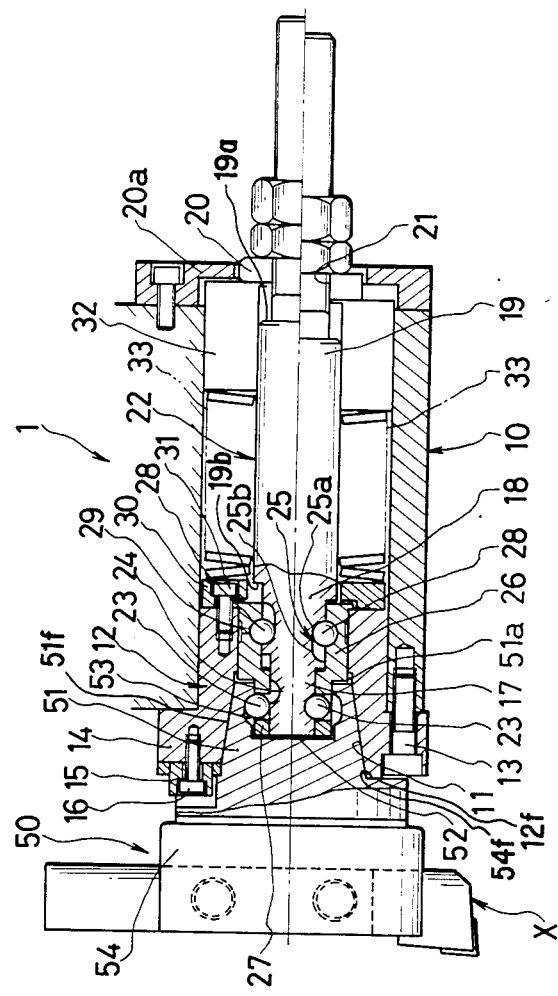
Figure 3:
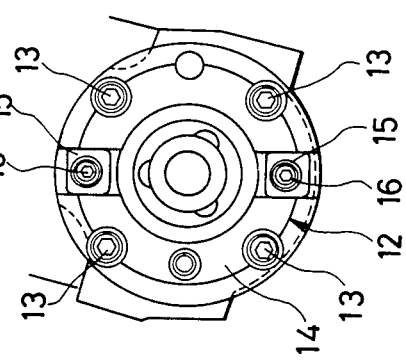
Figure 4:
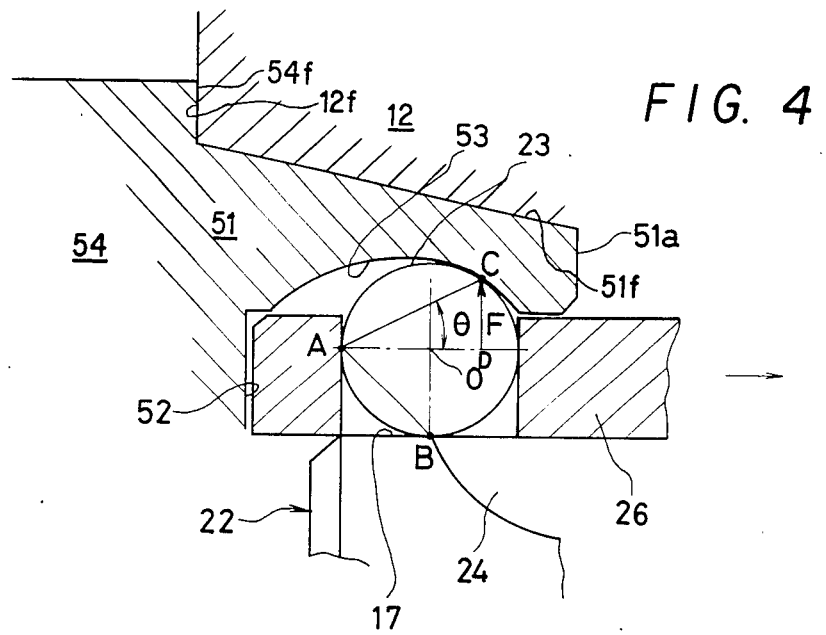
Figure 5:
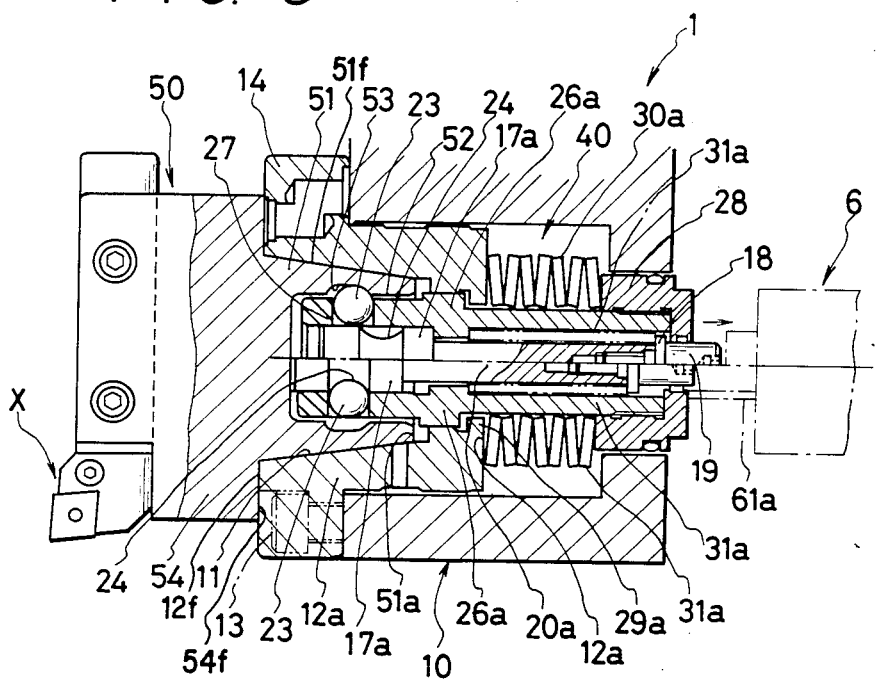
Figure 6:
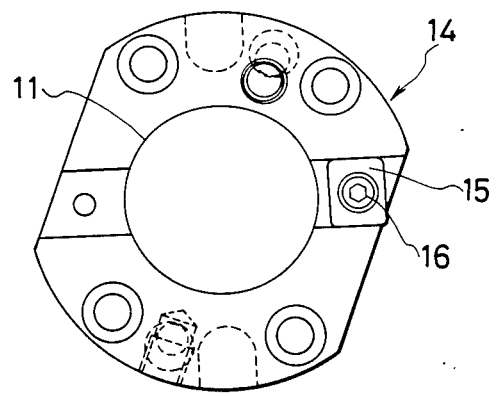
Figure 7:
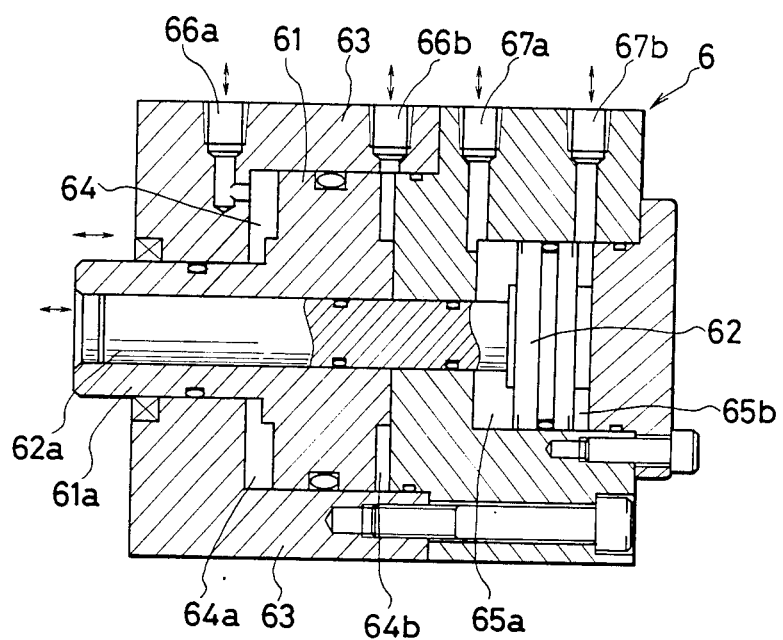

FIG. 1 is an overall perspective view embodying the present invention to a turret lathe;
FIG. 2 is a partial section view of a replaceable tool;
FIG. 3 is a side view of a taper sleeve;
FIG. 4 is an explanatory view of a locking portion;
FIG. 5 is a partial section view of a replaceable tool;
FIG. 6 is a side view of a taper sleeve; and
FIG. 7 is an expanded section view of a cylinder.

THE PREFERRED EMBODIMENTS

Hereinafter, the present invention will be described in connection with embodiments thereof, with reference to the attached drawings.

FIG. 1 shows the state under which a replaceable tool 1 is mounted to a tool post 4 of a turret 3 of a turret lathe 2. W denotes a work which is an object to be worked. 5 denotes a chuck for clamping the work W. 6 denotes a cylinder for attaching and removing a tool X of the replaceable tool 1. 6a shows a rod thereof.

As shown in FIGS. 2 and 3, the above-stated replaceable tool has the construction wherein a hollow cylindrical turret flange 10 of the replaceable tool is fixed on the tool post 4 by a fastening tool such as a bolt or the like and there is fixed a basis portion of a taper sleeve 12 with end face 12f and providing a tapered face 11 through a bolt 13 on the tip side or tool attachment end of this turret flange 10. A taper shank 51 with a taper face 51f of a tool holder mounting a normal tool X such as a cutting tool or the like can be removably fitted to the taper face 11 of this taper sleeve 12.

A predetermined depth of hole 52 or locking bore 52 is formed in the central part of an insert end 51a of the taper shank 51. A circular engageable ditch 53 (circumferential fitting groove) is formed on the inner circumference of this hole 52 (locking bore). A flange portion 14 for pressing, thereon, the rear end (or end face 54f) of a head portion 54 of the tool holder 50 is formed at the tip portion of the taper sleeve 12. A block 15 for locating the tool holder 50 is fixed on this flange portion 14 through a bolt 16. In the interior of the hollow part (i.e., interior of the bore) of the turret flange 10 and taper sleeve 12, at the tip side or tool attachment end, a small radial part 17 (locking part), a middle radial part 18 (drive part) and a large radial part or stopper part 19 with first and second stopper ends 19a, 19b are provided and at the rear end side or control end, a draw rod 22 fixing a stopper ring 20 through a screw 21 is slidably provided.

Further, 20a denotes a cover attached at the rear end portion or control end of the turret flange 10 in order to prevent the invasion of dust like cutting powder and the like into the hollow part.

A semicircular arc form of circular concave portion 24 (escape ditch or escape groove) for removably storing a plurality of locking balls (the present embodiment shows four balls) and a guide ditch 25 (or guide slot) for a stopper are formed on the outer circumference of the middle radial portion 18. Between the outer circumferences of the small portion 17 and the middle portion 18 of the draw rod 22 and the inner wall surface of the hole 52 formed in the central portion of the insert end of the taper shank 51, there is slidably provided the cylindrical draw collar 26 having some play against both surfaces.

At the tip part of this draw collar 26, a through-aperture 27 where locking balls 23 are coming in and out is formed at a plurality of locations (the present embodiment shows three locations) and at the inner surface of the rear end thereof, a circular stopper ditch 29 (or spherical notches) in which driving balls 28 are fitted is formed.

At the rear end of the taper sleeve 12, there is fixed a stopper ring 30 for restricting the rear end location of a draw collar 26 through a bolt 31. Between this stopper ring 30 and the stopper ring 20 provided for the rear end side of the draw rod 22, there is provided a counterspring 33 for forcing the draw collar 26 and the draw rod 22 to move in the right direction shown in FIG. 2 through a ring member 32 inserted slidably therebetween.

Next, the function is described.

At first, in FIG. 2, the view under the central line of the tool holder 50 shows the unlocking state between the tool holder 50 and the turret flange 10 and the view above the central line thereof shows the locking state therebetween.

In the unlocking state, the draw rod 22 is pressed toward the tool holder 50 by means of the rod 6a of the cylinder 6 and the locking ball 23 is stored in the circular concave portion 24 of the draw rod 22. Further, the ball 28 engaging with the stopper ditch 29 of the draw collar 26 is located on the side of the rear end 25a of the guide ditch 25.

In order to change the tool holder 50 from this condition to the locking state, at first, under the state of fitting the taper face 51f of the taper shank 51 of the tool holder 50 in the taper face 11 of the taper sleeve 12, the rear end or end face 54f of the head portion 54 is pressed on the flange portion 14 and on the end face 12f of the taper sleeve 12 and the rod 6a of the cylinder is shrunk. Then, the draw rod 22 is pulled in the axial direction (the right direction of FIG. 2) by the elasticity of the counter spring 33. Simultaneously, the ball 28 located on the side of the rear end 25a of the guide ditch 25 is removed toward the tip side 25b of the guide ditch 25 and then pressed thereon. During the removal, the ball locking 23 stored in the circular concave portion 24 is pushed out from the semicircular-arc-sectional form of circular concave portion 24 so as to be put in the through-aperture 27 of the draw collar 26 and the engageable ditch or circumferential fitting groove 53 of the taper shank 51. Then, the removal of the rod 22 makes the draw collar 26 go back through the ball 28 and the tip side 25b. When the draw collar 26 is pulled in the same direction with the draw rod 22 by the elasticity of the counterspring 33, the locking ball 23, which has been already pushed out of the through-aperture 27 of the draw collar 26 and the engageable ditch or circumferential fitting groove 53 of the taper shank 51, serves to pull the combined shank 51.

Then, as shown in FIG. 4, at first, the A point on the inner wall surface of the through-aperture 27 of the draw collar 26 serves to press the core part of the ball 23. Next, the core part is pressed at the B point on the outer circumference of the small radial part 17 and the locking ball 23 is locked at the C point in the engageable ditch 53 by receiving the force in the nearly horizontal direction with a degree of $\theta$.

Namely, in this embodiment, the A point for pressing of the locking ball 23 serves to press the ball 23 in the horizontal direction at the nearly same location with the core O of the locking ball 23. Thus, the component of a force F for pressing the ball in the radial direction of the turret flange 10 is made much smaller than the conventional component of a force. Instead, since the degree $\theta$ is quite small as described above, the impellent force operating the locking ball 23 in the horizontal direction (axial direction of the draw rod 22) is made larger and thus the pulling force in the axial direction of the tool holder 50 is made larger. The tip portion of the taper shank 51 forming the engageable ditch or circumferential fitting groove 53 is expanded and pressed on the inner wall surface of the taper sleeve 12 through the locking ball 23 by means of the attraction of the draw collar 26 and the draw rod 22. Thus, it also serves to expansively press the rear part of the shank 51 more strongly in addition to the support against the rear part by the flange portion 14 of the taper sleeve 12 and the head portion 54 of the tool holder 50. Consequently, the self-excited vibration such as bringing about the vibration of the tool holder 50 is made to be hardly brought about.

Further, under the state of movably inserting the draw collar 26 in the holes of the draw rod 22 and the taper sleeve 12, the locking balls 23 are engaged with the engageable ditch 53 of the taper shank 51 through the ball 28 fitted in the guide ditch 25 of the draw rod 22, as pulled by the through-aperture 27 of the draw collar 26. Thus, in case the taper shank 51 is abraded, a plurality of locking balls 23 are always pressed on the engageable ditch or circumferential fitting groove 53 uniformly so as to pull the tool holder 50 in the axial direction at a uniform force.

Further, since the thickness of the tip of the taper shank 51 can be made thinner, the thickness of the draw collar 26 requiring intensity can be made thicker.

In addition, in this embodiment, the tool holder having the taper shank 51 is described, but it is possible to embody the present invention by using a straight shank. Further, this tool holder 50 can be attached to the conventional tool X and can be further utilized in a wide range.

Next, FIGS. 5 to 7 show a second embodiment of the present invention. In the description below, the same components with the above-stated prior art have the same numerals.

As shown in FIGS. 5 to 7, a replaceable tool 1 has the construction wherein a hollow cylindrical turret flange 10 is fixed on a turret 3 and a base of a taper sleeve 12 with end face 12f and providing a tapered face 11 is fixed on the tip side or tool attachment end of the turret flange 10 through a bolt 13. A taper shank 51 with a taper face 51f of a tool holder 50 attaching a normal tool X such as a cutting tool or the like can be detachably fitted in the tapered face 11 of the taper sleeve 12. A predetermined depth of hole or locking bore 52 is formed in the central part of an insert end 51a of the taper shank 51. A circular engageable ditch 53 (circumferential fitting groove) is formed on the inner circumference of this hole 52.

Further, a flange portion 14, on which a rear end or end face 54f of a head portion 54 of the tool holder 50 is pressed, is formed on the tip portion of the taper sleeve 12. As shown in FIG. 6, a block 15 for locating the tool holder 50 is fixed on this flange portion 14 through a bolt 16. The turret flange 10 and the central part of the taper face of the taper sleeve 12 provide fastening means 40 for pulling the tool holder 50 toward the taper face 11 of the taper sleeve 12. This fastening means 40 provides a large radial part 17 at its tip side and, at the interior thereof, provides a slidable draw rod 20a fixing a stopper ring 18 through a bolt 19 at its rear end side.

On the outer circumference of the large radial part 17a of the draw rod 20a, there is formed a semicircular-arc-section of circular concave portion 24 (escape ditch or escape groove) for removably storing a plurality of locking locking balls 23 (this embodiment shows two balls). Between the outer circumference of the large radial diameter 17a of the draw rod 20 and the inner wall surfaces of the tapered face 11 of said taper sleeve 12 and the hole 52 formed on the central part of the insert end of the taper shank 51, there is slidably provided a hollow cylindrical draw collar 26a. At the tip portion of this draw collar 26a, a through-aperture 27 where locking balls 23 are coming in and out is formed at a plurality of locations (this embodiment shows two balls ) and at the rear end portion, a stopper member 28 such as a nut or the like is fixed. At the rear end of the taper sleeve 12, a projection 29a for regulating the rear end location of the draw collar 26a is integrally provided. Between the rear end surface 12a of the taper sleeve 12 and the stopper member 28 provided at the rear end portion of the draw collar 26a, there is provided a first elastic member 30a such as a counterspring or the like for always forcing the draw collar 26a to move in the right direction of FIG. 2 (arrow direction).

Moreover, between a step 26a formed in a hollow part of the draw collar 26a and the stopper ring 18 providing the draw rod 20a at the rear end side, there is provided a second elastic member 31a such as a coil spring or the like whose elasticity is much smaller than the elasticity of the first elastic member 30a and which serves to always force the draw rod 20a to move in the right direction of FIG. 2. Further, a cylinder 6 operated for attaching or removing the tool X from the replaceable tool 1 is, as shown in FIG. 4, a multistage oil pressure cylinder providing a hollow cylindrical first piston 61 and second piston 62. Within a casing 63, there are sectioned first cylinder chambers 64a, 64b slidably mounting the first piston 61 and second cylinder chambers 65a, 65b mounting the second piston 62.

And a piston rod 62a of the second piston 62 is slidably inserted into a piston rod 61a of the first piston 61 in order that respective piston rods 61a and 62a sequentially appear or disappear.

In addition, 66a, 66b and 67a, 67b denote an inlet and exhaust port for feeding and exhausting operation pressure fluid in the first cylinder chamber 64 and the second cylinder chamber 65.

Next, the function of the above-stated embodiment is described.

In FIG. 5, the view under the central line of the tool holder 50 shows the unlocking state between the tool holder 50 and the taper sleeve 12 and the view above the central line thereof shows the locking state.

At first, in order to change the locking state above the central line to the unlocking state under the central line, the operation pressure fluid is supplied in the inlet and exhaust port 66b of the cylinder 6 so as to operate the first piston 61 for pressing the piston rod 61a on the stopper member 28 and at once the first elastic member 30a is compressed to be pushed in the left direction of FIG. 2 (to be removed by about 1 mm). Then, the locking balls 23, pressed on the rear end side of the engageable ditch circumferential fitting groove 53 against the elasticity of the first elastic member 30a are made to bounce. Next, the operation pressure fluid is supplied in the inlet and exhaust port 67a so as to expand the second piston 62 for pressing the bolt 19 integrally retained with the draw rod 20a by the piston rod 62a in the left direction of FIG. 2 in opposition to the elasticity of the second elastic member 31a. Thus, the locking balls 23 whose locking state is released are fallen in the semicircular concave portion 24 of the large radial part 17 in order that the locking state of the tool holder 50 is completely released.

In the operation for unlocking, described above, the second piston 62 does not require large pressure, because the second elastic member 31a has much weaker elasticity than the first elastic member 30a.

Then, in order to change the tool holder 50 from this unlocking state to the locking state, under the state of fitting the taper shank 51 of the tool holder 50 in the tapered face 11 of the taper holder 12, the rear end of the head portion 54 is inserted to the flange portion 14 of the taper sleeve 12. And the second piston 62 of the cylinder 6 is stored in the cylinder 6. As a result, the draw collar 26a and the draw rod 20a are pulled in the axial direction (the right direction of FIG. 5) by the elasticity of the second elastic member 31a. Simultaneously, the balls stored in the circular concave portion 24 are pushed out of the semicircular-arc-section of circular concave portion 24 so as to be fitted in the through-apertures 27 of the draw collar 26a and the engageable ditch or circumferential fitting groove 53 of the taper shank 51.

Next, in case the first piston 61 is stored in the cylinder 6, the balls are pulled in the axial direction by the elasticity of the first elastic member 30a and are pushed out of the through-apertures 27 of the draw collar 26a and the engageable ditch or circumferential fitting groove 53 of the taper shank. Then, as shown in FIGS. 4 and 5, the core part of the locking ball 23 is pressed on the A point of the inner wall surface of the through-aperture 27 of the draw collar 26a and then is pressed on the B point of the outer circumference of the large radial part 17 of the draw rod 20a. And the locking ball 23 is locked at the C point of the engageable ditch 5 in receipt of the impellent force in the nearly horizontal direction with a degree of 74.

Namely, the A point where the locking ball 23 is pressed serves to press the ball at an almost same location with the core O of the locking ball 23 in the horizontal direction. Thus, the component of a force F for pressing the locking ball 23 in the radial direction of the turret flange 10 is made to be much smaller than the conventional one. Instead, since the degree θ is quite small as described above, the impellent force for pressing the locking ball 23 in the horizontal direction (axial direction of the draw rod 20a) is made larger. As a result, the force of pulling the locking ball 23 in the axial direction of the tool holder 50 is made larger.

The tip portion of the taper shank 51 forming the engageable ditch or circumferential fitting groove 53 is expanded and pressed on the inner wall side of the taper sleeve 12 through the locking balls 23 by means of the attraction of the draw collar 26a and draw rod 20a. Thus, it also serves to expansively press the rear part of the shank 51 more strongly in addition to the support against the rear part by the flange portion 14 of the taper sleeve 12 and the head portion 54 of the tool holder 50. Consequently, the self-excited vibration such as bringing about the vibration of the tool holder 50 is decreased in number. Further, the locking ball 23 is engaged with the engageable ditch 53 of the taper shank 51 through the locking ball 23 fitted in the circular concave portion 24 of the draw rod 20a as pulled by the through-aperture 27 of the draw collar 26a when among the outer circumference of the large radial portion 17 of the draw rod 20a, the tapered face 11 of the taper sleeve 12 and the hole 52 formed in the central part of the insert end of the taper shank 51, there exists, what is called, a play. Thus, in accordance with the floating of the draw collar 26a, a plurality of locking balls 23 are uniformly pressed on the engageable ditch or circumferential fitting groove 53 so as to pull the tool holder 50 in the axial direction by the uniform force.

Further, since it is possible to reduce the component of force F in the radial direction of the turret flange 10, the thickness of the tip of the taper shank 51 can be made smaller. Consequently, it is made to be easy to expand the tip portion of the taper shank 51 pressed through the locking ball 23 and besides it is possible to thicken the thickness of the draw collar 26a requiring a regidity.

Moreover, the tool holder including the taper shank 51 is described in the present embodiment, but it is possible to embody it by a straight shank. Further, the tool holder 50 can be attached to the conventional tool X and can be further utilized in a wide range.

The present invention has the following excellent effects on the basis of the above-stated construction.

(1) The tool holder is always supported at two points on the tip side and the rear end side by means of the sleeve and at once is pulled in the axial direction by strong attraction. Accordingly, there is provided the effect that it is possible to effectually prevent the self-excited vibration and thus to attempt the amelioration of the cutting efficiency and the working accuracy.

(2) The shank portion is expanded through a plurality of locking balls by pulling the draw collar in the axial direction of the sleeve so as to be pressed on the inner wall surface of the fitted hole of the sleeve. Thus, there is provided the effect that it is possible to effectually prevent the self-excited vibration of the tool holder and thus to ameliorate the cutting efficiency and the working accuracy.

(3) The impellent force for pressing the tool holder in the axial direction of the turret flange is made smaller by pulling the core parts of the locking balls in the horizontal direction and on the other hand, the impellent force of the locking balls in the horizontal direction is made larger. Accordingly, there is provided the effect that the strong locking state can be retained.

(4) Even if a gap is brought about at the fitted portion between the tool holder and the sleeve by means of a working error, an abrasion and the like, the uniform pressing force caused by the locking balls serves to effectually absorb the gap so as to always provide the secure locking state.

(5) Since the present invention can be constructed to optionally arrange the pressure in the locking direction of the draw rod, there is provided the effect that it is possible to bring about the locking states corresponding with various kinds of tools.

(6) The present invention, as described above, has the construction wherein there are provided a first elastic member for forcing the balls to be always engaged in the engageable ditch of the tool holder between the taper sleeve end and the stopper member fixed on the rear end side of the draw collar and a second elastic member for releasing the balls between the inner wall surface of the draw collar and the stopper ring provided on the rear end of the draw rod, and the shank of the tool holder can be released from the fitted hole of the taper sleeve by pressing the rear end of the draw rod. Thus, when the tool holder is released especially from the taper sleeve, it is possible to simply release the tool holder without requiring a large operational force and to lessen the powerful flexible margin and to decrease the springs in number. As a result, the thickness of the turret flange 10 can be made thinner. Further, there is caused the effect that, by parallelly arranging the first elastic member and the second elastic member, the overall length of the replaceable tool and at once the cylinder stroke are shortened so as to achieve wholly compact construction. Moreover, there is provided the effect that, even if a gap is brought about at the fitted portion by a working error, an abrasion and the like, it is possible to always obtain the secure locking state caused by effectually absorbing the gap by means of the uniform pressure of the locking balls and to prevent the self-excited vibration or the like of the tool holder in the case of the heavy cutting and to remarkably ameliorate the cutting efficiency and the working accuracy.

We claim:

1. A replaceable tool comprising:
   a tool holder having a head portion with a first end face, and a taper shank including a first taper face extending from said first end face, said taper shank having a locking bore formed in an end portion thereof on the side of a support means for said tool holder, said locking bore being formed with a circumferential fitting groove;
   a taper sleeve including a second end face and a second taper face, for holding said first end face and said taper shank of said tool holder and said second end face and said second taper face of said taper sleeve abutting against each other, respectively;
   locking balls;
   a cylindrical draw collar slidably fitted in said locking bore in said taper shank, said draw collar being provided with through-apertures for receiving therein said locking balls engageable also in said circumferential fitting groove;

a draw rod slidably fitted in said cylindrical draw collar and having a locking part for fitting said locking balls into said fitting groove to lock said tool holder and an escape groove into which said locking balls can enter in a locking-released condition of said tool holder;

means provided to said taper sleeve for preloading said draw collar in the direction of pulling said tool holder; and means provided to said taper sleeve for preloading said locking part to align it with said through-apertures in position, said circumferential fitting groove having a sectional configuration in said draw collar against which said locking balls abut.

2. The replaceable tool according to claim 1, wherein said taper shank portion is expanded through a plurality of locking balls by pulling said draw collar in the axial direction of said draw collar, so said taper shank portion is pressed on the inner wall surface of said taper face of said draw collar, 3. The replaceable tool according to claim 2, wherein core parts of said locking balls are pulled in the axial direction of said draw collar by said draw collar so as to reduce the component of a force for pressing said balls in the radial direction of said turret flange, while the impellent force of said locking balls in the horizontal direction is enlarged.

4. The replaceable tool according to claim 2, wherein the circumferential fitting groove for engaging said locking balls therewith is deeply formed.

5. A machine tool arrangement for attaching a tool holder to a turret flange mounted upon a tool post, comprising:

a turrel flange having a bore, a tool attachment end and a control end;

a tool holder having a head portion with a first end face, and a taper shank including a first taper face extending form said first end face, said taper shank having locking bore formed in end portion thereof on the side of said turret flange, said locking bore being formed with a circumferential fitting groove;

a taper sleeve including a second end face and a second taper face, for holding said first end face and said taper shank of said tool holder and said second end face and said second taper face of said taper sleeve abutting against each other, respectively;

a draw rod slidably inserted in said locking bore, said draw rod including a stopper part on the side of said control end, a locking part on the side of said tool attachment end, and a drive part intermediate between said stopper part and said locking part, said locking apart having a circumferential escape groove, said drive part having a circumferential guide slot, said stopper part having stopper ends for defining the length of stroke of said draw rod;

a draw collar slidably fitted between said taper sleeve and said draw rod, said draw collar being engaged and driven by said drive part and the length of its stroke being defined by said stopper part, said draw collar having a plurality of spherical notches formed in a portion of its inner margin and a plurality of through-apertures formed near said attachement end, the portion of the draw collar formed with said through-apertures slidably fitting in said locking bore of said taper shank;

driving balls located in said spherical notches of said draw collar and engageable in said guide slot of said drive part to drive said draw rod;

locking balls fitted in said through-apertures of said draw collar and, in an unlocking free condition thereof, projected toward said escape groove of said locking part; and a spring disposed between said taper sleeve and said draw rod and preloading said tool holder toward said control end.

6. A machine tool arrangement for attaching a tool holder to a turret flange mounted upon a tool post, comprising:

a turret flange having a bore, a tool attachment end and a control end;

a tool holder having a head portion with a first end face, and a taper shank including a first taper face extending from said first end face, said taper shank having a locking bore formed in an end portion thereof on the side of said turret flange, said locking bore being formed with a circumferential fitting groove;

a taper sleeve including a second end face and a second taper face, for holding said first end face and said taper shank of said tool holder and said second end face and said second taper face of said taper sleeve abutting against each other, respectively;

a draw rod slidably fitted in said cylindrical draw collar and having a stopper mounted on an end portion on the side of said control end, a locking part for fitting said locking balls in said fitting groove to lock said tool holder, and a circumferential escape groove in an end portion on the side of said tool attachment end;

a cylindrical draw collar having a locking part slidably fitted in said locking bore of said taper shank and provided with a plurality of through-apertures at said attachment end for receiving locking balls, and a hollow cylindrical draw collar slidably mounted to said taper sleeve and extending to the side of said control end;

locking balls fitted in said through-apertures of said draw collar and, in an unlocking condition thereof, projects toward said circumferential escape groove;

a spring disposed between said taper sleeve and said hollow cylindrical draw collar and preloading said tool holder toward said control end; and a spring disposed between said draw rod and said hollow cylindrical draw collar and preloading said locking part to align it with said through-apertures in position.

* * * * *

UNITED STATES PATENT AND TRADEMARK OFFICE
CERTIFICATE OF CORRECTION

PATENT NO. : 4,680,999
DATED : July 21, 1987
INVENTOR(S) : SADAO KOJIMA ET AL It is certified that error appears in the above-identified patent and that said Letters Patent is hereby corrected as shown below:

On the cover page, Item [73], after "Seiki Corporation" insert --- , Tochigi-ken; and after "Ltd." change "both of Tokyo," to --- Tokyo, both of Japan ---.

Signed and Sealed this

Second Day of February, 1988

Attest:

DONALD J. QUIGG

*Attesting Officer*      *Commissioner of Patents and Trademarks*